(12) United States Patent
Jung

(10) Patent No.: US 9,838,859 B2
(45) Date of Patent: Dec. 5, 2017

(54) EMERGENCY CALLING SYSTEM FOR VEHICLE

(71) Applicant: Hyundai Motor Company, Seoul (KR)

(72) Inventor: Yean Tae Jung, Seoul (KR)

(73) Assignee: Hyundai Motor Company, Seoul (KR)

( * ) Notice: Subject to any disclaimer, the term of this patent is extended or adjusted under 35 U.S.C. 154(b) by 108 days.

(21) Appl. No.: 14/887,094

(22) Filed: Oct. 19, 2015

(65) Prior Publication Data
US 2016/0127879 A1 May 5, 2016

(30) Foreign Application Priority Data

Oct. 15, 2014 (KR) .......................... 10-2014-0139173

(51) Int. Cl.
*H04W 4/22* (2009.01)

(52) U.S. Cl.
CPC ...................................... *H04W 4/22* (2013.01)

(58) Field of Classification Search
CPC ... H04W 4/22; H04M 1/0262; H01M 2/1016; H01M 2/1022
USPC ............... 455/404.1, 550.1, 571, 572, 575.1; 409/182
See application file for complete search history.

(56) References Cited

U.S. PATENT DOCUMENTS

2012/0141854 A1* 6/2012 Lee ..................... H01M 2/1077
  429/99
2013/0156533 A1* 6/2013 Yu ....................... H01M 2/1005
  414/729

FOREIGN PATENT DOCUMENTS

KR   10-2012-0059849    12/2012
KR   10-2013-0069112     9/2013
KR   10-2014-0005959     1/2014

OTHER PUBLICATIONS

Korean Office Action issued in application No. 10-2014-0139173, dated Aug. 18, 2015.

* cited by examiner

*Primary Examiner* — Sam Bhattacharya
(74) *Attorney, Agent, or Firm* — Mintz Levin Cohn Ferris Glovsky and Popeo, P.C.; Peter F. Corless

(57) ABSTRACT

An emergency calling system includes a housing for accommodating a radio communication module; a battery mounting guide including a battery frame in which a battery is seated; a connector holder disposed at one end of the battery frame and a knob disposed at another end of the battery frame; a battery mounting unit, which is provided on one side of the housing and in which the battery mounting guide is fitted; a unit connector, which is disposed at an inner end of the battery mounting unit and is connected to a connector of the battery; and a locking unit for locking the battery mounting guide to the battery mounting unit. The emergency calling system enables easy replacement of the battery without requiring opening and closing the entire housing to replace the used battery.

12 Claims, 5 Drawing Sheets

EMERGENCY CALLING SYSTEM FOR VEHICLE

This application claims the benefit of Korean Patent Application No. 10-2014-0139173, filed on Oct. 15, 2014, which is hereby incorporated by reference as if fully set forth herein.

BACKGROUND (a) Field of the Invention

The present invention relates to an emergency calling system which includes a battery mounting guide which enables a battery mounted in the emergency calling system to be easily replaced.

(b) Description of the Related Art

In certain European/Asian countries, an emergency calling system known as "eCall," which is capable of providing various safety-related information necessary for emergency service through radio communication in the event of an accident, is required by law to be mounted in every vehicle.

In general, an emergency calling system (such as eCall) is constructed so as to manage a user's phone number and e-mail address together and connect the user's phone number or e-mail address to previously designated land lines, cellular phones, personal computers, or the like. When the emergency calling system gets a phone call from the contractant through the contractant's phone number, the emergency calling system automatically connects the contractant's phone with up to three previously designated places, including cellular phones, so as to inform the contractant of the emergency.

Since the emergency calling system has to maintain the state of being capable of being activated at any time for emergency preparedness, the emergency calling system is required to contain a replaceable battery.

In order to replace the battery used in a conventional emergency calling system, the emergency calling system must be removed from a vehicle and the housing of the emergency calling system must then be opened, which is very cumbersome.

SUMMARY

An object of the present invention is to provide an emergency calling system including a detachable battery mounting guide.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an emergency calling system includes a housing for accommodating a radio communication module therein; a battery mounting guide including a battery frame in which a battery is seated; a connector holder disposed at one end of the battery frame and a knob disposed at another end of the battery frame; a battery mounting unit, which is provided on one side of the housing and in which the battery mounting guide is fitted; a unit connector, which is disposed at an inner end of the battery mounting unit and is connected to a connector of the battery; and a locking unit for locking the battery mounting guide to the battery mounting unit.

The knob may be configured to have a circular plate shape, and may be rotatably coupled to the battery frame.

The locking unit may include a locking protrusion protruding from the battery mounting unit, and a locking groove, which is formed in an outer circumferential surface of the knob and with which the locking protrusion engages so as to lock the battery mounting guide.

The locking groove may include a first locking groove section extending along the outer circumferential surface of the knob, and a second locking groove section extending from one end of the first locking groove section to the inner surface of the knob that faces the battery frame.

The knob may include a groove formed in the outer surface thereof so as to allow the knob to be grasped by a user' finger.

The connector holder may include a lower holder part secured to the battery frame, and an upper holder part, which is detachably coupled to the lower holder part and is coupled to an upper portion of the battery connector.

The emergency calling system may further include a first pin passing through both ends of the battery frame, and a second pin protruding from an inner end of the battery mounting unit, wherein, when the battery mounting guide is inserted into the battery mounting unit, the second pin pushes the inner end of the first pin, and the first pin is projected from the external end of the battery frame.

The battery frame may be configured to have a rectangular shape surrounding the battery.

The battery frame may have provided on the inner surface thereof a frictional member having a high coefficient of friction.

The battery frame may include a support for supporting the lower portion of the battery.

The emergency calling system may further include a leaf spring provided at an inner end of the battery mounting unit, wherein the leaf spring pushes out the battery mounting guide from the battery mounting unit when the locking unit is released.

The leaf spring may include a pair of leaf springs, which are respectively positioned above and under the unit connector.

The leaf spring may be configured to have an arcuate shape that is convex outward from the inner end of the battery mounting unit.

According to at least one embodiment of the present invention, the emergency calling system obviates the troublesome work of opening and closing the entire housing 11 and replacing the used battery in the emergency calling system with a fresh one, thus making it easier to replace the battery.

Further, it is possible to determine whether a battery is correctly mounted in the emergency calling system.

In addition, since the battery mounting guide alone is projected from the battery mounting unit when the locking unit is released, it is possible to easily separate the battery mounting guide.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
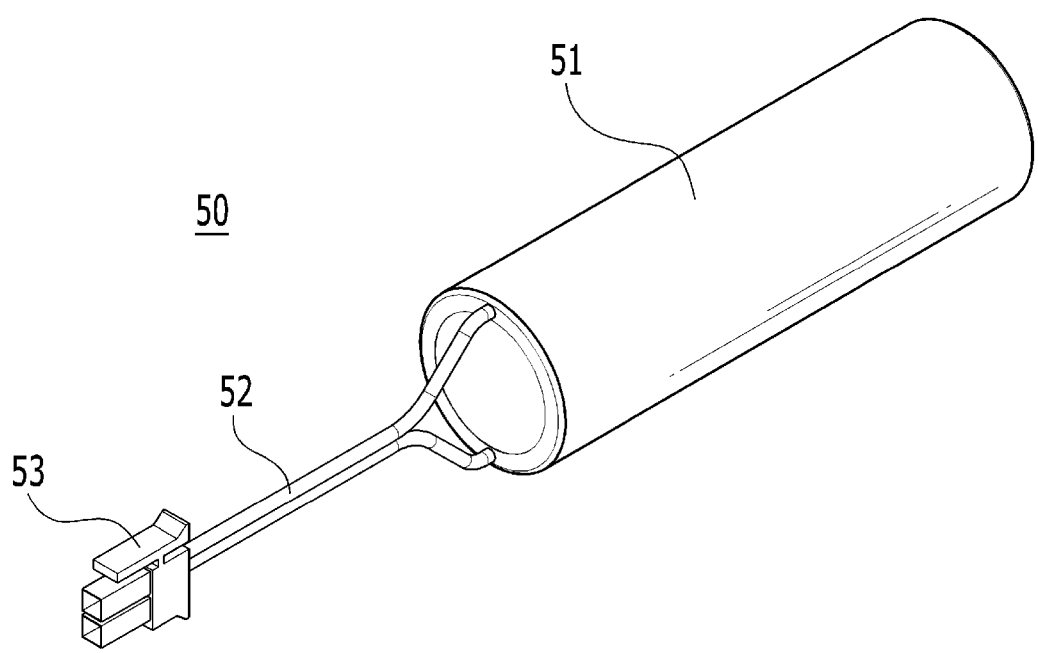
FIG. 1 is a perspective view showing a battery adapted to be mounted in a battery mounting guide.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated.

The accompanying drawings are used to assist in easy understand of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms "first", "second", etc. may be used herein to describe various elements, these elements should not be limited by these terms. These terms are only used to distinguish one element from another.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In European/Asian countries, an emergency calling system 10 (for example, known as "eCall"), which is capable of providing various safety-related information necessary for emergency service through radio communication in the event of an accident, is required by law to be mounted in every vehicle.

The emergency calling system 10 is constructed to manage a user's phone number and e-mail address together and connect the user's phone number or e-mail address to previously designated land lines, cellular phones, personal computers, or the like. When the emergency calling system 10 gets a phone call from the contractant through the contractant's phone number, the emergency calling system 10 automatically connects the contractant's phone with up to three previously designated places including the cellular phones so as to inform the contractant of the emergency.

Since the emergency calling system 10 has to maintain the state of being capable of being activated at any time for emergency preparedness, the emergency calling system 10 is required to contain a replaceable battery 50. FIG. 1 is a perspective view showing the battery 50 adapted to be mounted in a battery mounting guide 20.

The battery 50, which is to be mounted on the emergency calling system 10, includes a battery cell 51 storing electricity, electric wires 52 connected to the positive electrode and negative electrode of the battery cell 51, and a battery connector 53, which is provided at the ends of the electric wires 52 and is connected to the emergency calling system 10 so as to supply power to the emergency calling system 10.

The battery 50 is mounted on the emergency calling system 10 in such a manner that the battery cell 51 is seated at the emergency calling system 10, and the battery connector 53 is connected to a unit connector 13 disposed in the emergency calling system 10.

Figure 2:
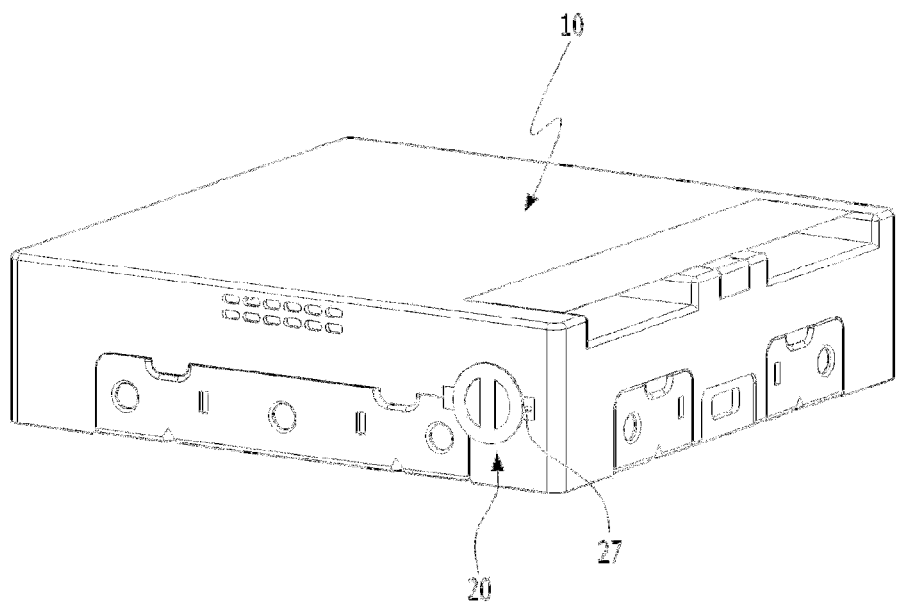
FIG. 2 is a perspective view showing an embodiment of the emergency calling system according to the present invention.
Figure 3:
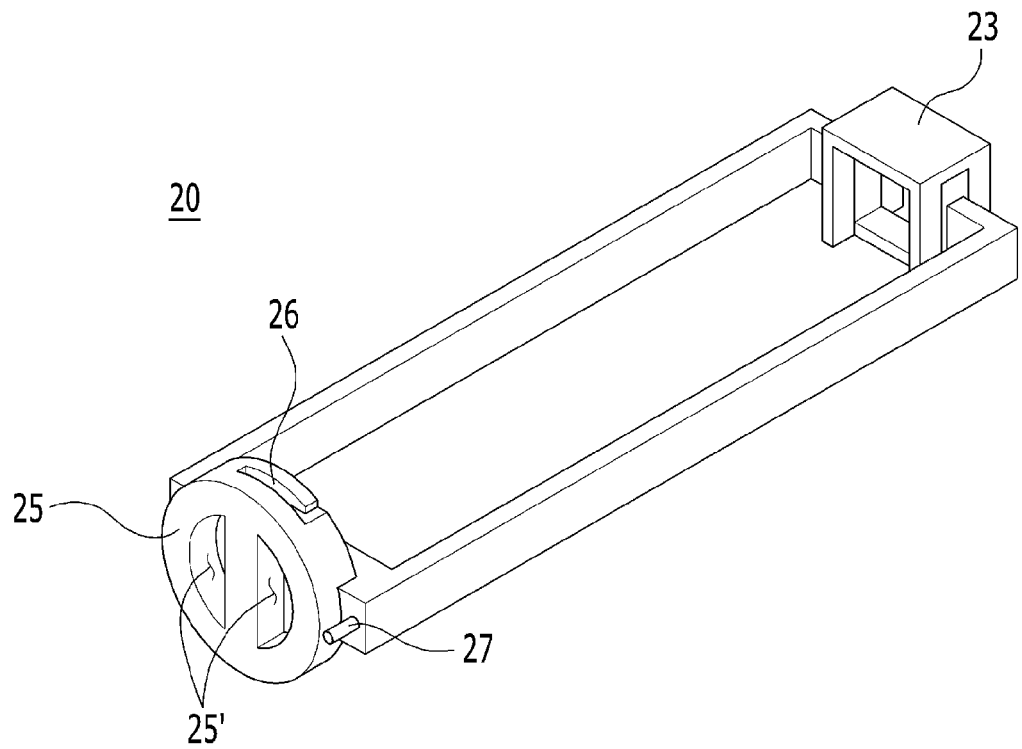
FIG. 3 is a perspective view showing an embodiment of a battery mounting guide of the emergency calling system according to the present invention.

The present invention adopts the battery mounting guide 20, which is releasably mounted on the emergency calling system 10 so as to allow the battery 50 to be easily mounted on the emergency calling system 10. FIG. 2 is a perspective view showing an embodiment of the emergency calling system 10 according to the present invention. FIG. 3 is a perspective view showing an embodiment of the battery mounting guide 20 of the emergency calling system 10 according to the present invention.

As shown in FIG. 2, the battery mounting guide 20 may be fitted into and withdrawn from a battery mounting unit 12 provided on one side of the emergency calling system 10. As shown in FIG. 3, the battery mounting guide 20 includes a battery frame 21, a connector holder 23 and a knob 25.

Figure 4:
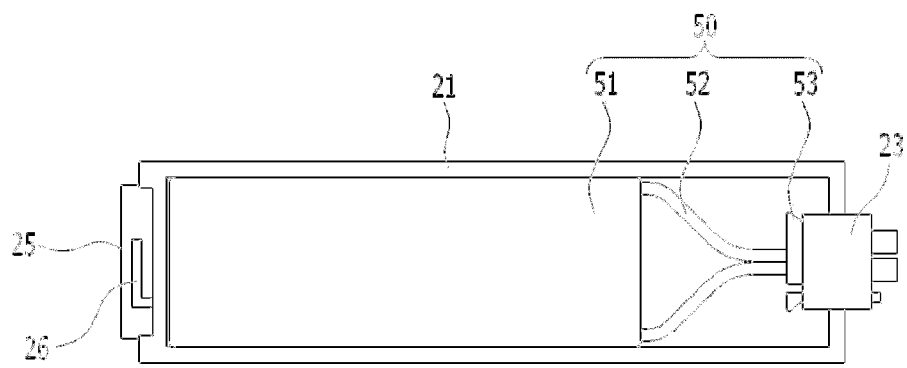
FIG. 4 is a plan view showing the battery mounting guide to which the battery is coupled.

The battery frame 21 is configured to have a rectangular frame shape having a central opening so as to accommodate the battery therein. FIG. 4 is a plan view showing the battery mounting guide 20 to which the battery 50 is coupled. The battery 50 is centrally fitted in the battery frame 21.

The battery frame 21 may further include a support (not shown) which is disposed at a lower portion thereof so as to support a lower portion of the battery 50. The support may be configured to have a curved shape corresponding to the shape of the battery 50. Since the battery cell 51 has a cylindrical shape, the support may be configured to have a semi-cylindrical shape, which is one of the two halves resulting from cutting a cylinder.

In order to support the battery 50 using the battery frame 50, which has only wall portions disposed at the lateral sides without any lower support, silicone members, rubber members, or the like having a high frictional force are provided on the inner surface of the battery frame 21, whereby the battery 50 is not easily separated from the battery frame 21.

The connector holder 23, which is disposed at an end of the battery mounting guide 20, receives the battery connector 53. When the battery mounting guide 20 is fitted into the battery mounting unit 12 of the emergency calling system 10, the connector holder 23 first enters the battery mounting unit 12. The connection between the unit connector 13 positioned in the battery mounting unit 12 and the battery connector 53 allows power to be supplied to the emergency calling system 10.

Figure 5:
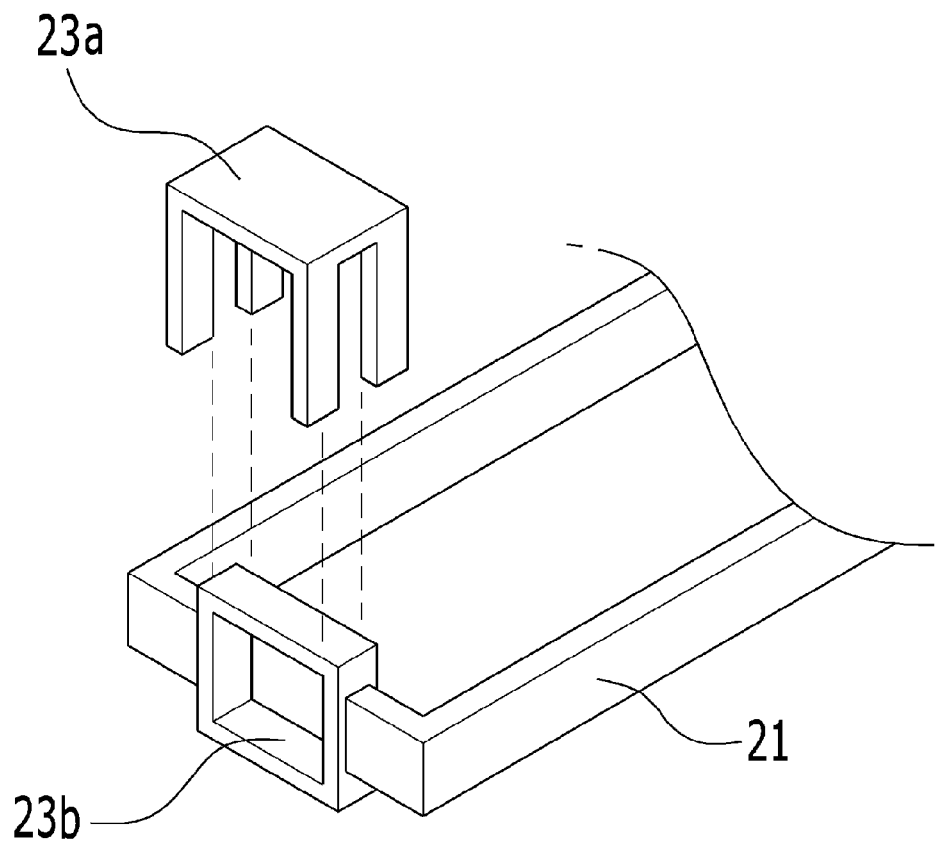
FIG. 5 is an exploded perspective view showing a connector holder of the battery mounting guide of FIG. 3.

FIG. 5 is an exploded perspective view showing the connector holder 23 of the battery mounting guide 20 of FIG. 3. As shown in FIG. 5, the connector holder 23 includes an upper holder part 23a and a lower holder part 23b, with the battery connector 53 positioned in the upper holder part 23a and the lower holder part 23b.

The lower holder part 23b is secured to the battery frame 21, and the upper holder part 23a is detachably coupled to the lower holder part 23b. The upper holder part 23a and the lower holder part 23b are configured to have an interference fitting structure, thus engaging with each other.

The knob 25, which is positioned at the other end of the battery mounting guide 20, may be grasped by the user's hand at the time of mounting and separation of the battery mounting guide 20. Further, the knob 25 is exposed to the outside from a housing 11 so as to prevent the interior of the battery mounting unit 12 from being viewed from the outside.

The knob 25 may be provided on the outer surface thereof with grooves 25' so as to make it easy for the user to grasp the knob 25. The user may insert his/her fingers into the grooves 25' to grasp the knob 25. For example, because the user grasps the knob 25 with his/her thumb and forefinger, it may be suitable to provide two grooves 25'. Each of the grooves 25' must be sufficiently large to accommodate the user's finger.

The knob 25 is configured to have a circular plate shape, and is rotatably coupled to the battery frame 21. Specifically, the knob 25 is configured to have a circular plate shape so as to be applicable to a battery 50 having a cylindrical shape and to be rotatable without being caught.

The knob 25 is provided on the outer circumferential surface thereof with a locking groove 26, and the battery mounting unit 12 is provided with a locking protrusion 16. As a result, when the locking protrusion 16 on the battery mounting unit 12 engages with the locking groove 26 in the knob 25, the battery mounting guide 20 can be securely coupled to the battery mounting unit 12. The locking protrusion 16 engages with the locking groove 26 through rotation of the knob 25. A detailed description of the locking unit (the locking groove 26 and the locking protrusion 16) will be given later.

Figure 6:
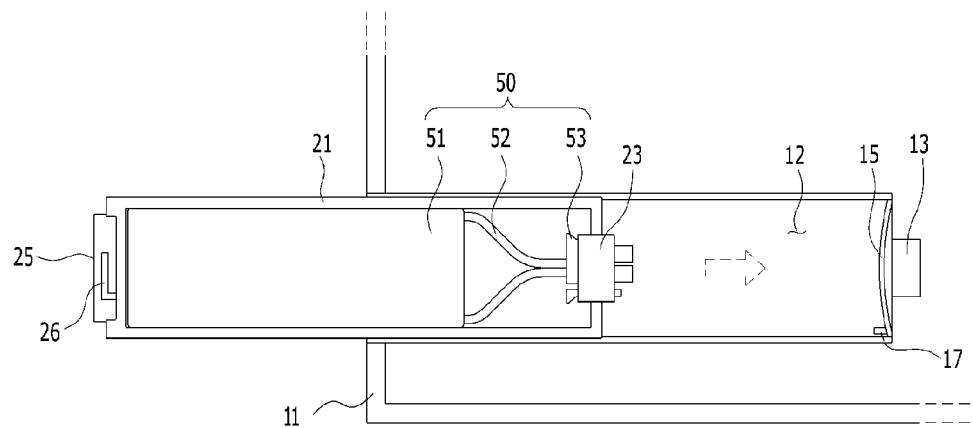
FIG. 6 is a plan view showing the procedure of fitting the battery mounting guide shown in FIG. 3 into a battery mounting unit.

FIG. 6 is a plan view showing a procedure of fitting the battery mounting guide 20 shown in FIG. 3 into the battery mounting unit 12. As shown in FIG. 6, the battery mounting guide 20 is fitted into the battery mounting unit 21, which is provided at one side of the housing 11. At this time, the fitting of the battery mounting guide 20 begins with insertion of the connector holder 23 of the battery mounting guide 20 into the battery mounting unit 12.

Figure 7:
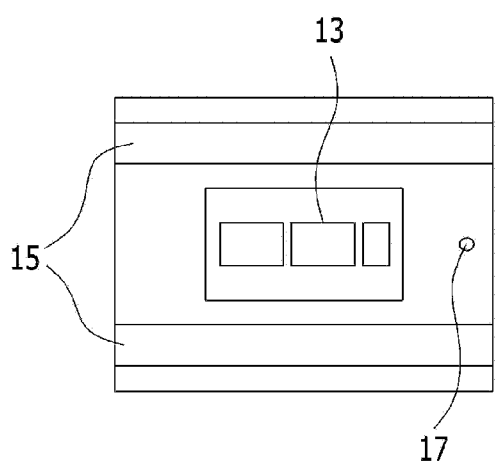
FIG. 7 is an end view showing the inner end of the battery mounting unit of the emergency calling system according to the present invention.

The battery mounting unit 12 is provided at one inner end thereof with the unit connector 13 to be coupled to the battery connector 53. FIG. 7 is an end view showing the inner end of the battery mounting unit 12 of the emergency calling system 10 according to the present invention. As shown in FIG. 7, the unit connector 13 is located at a position corresponding to the battery connector 53 coupled to the connector holder 23.

Figure 8:
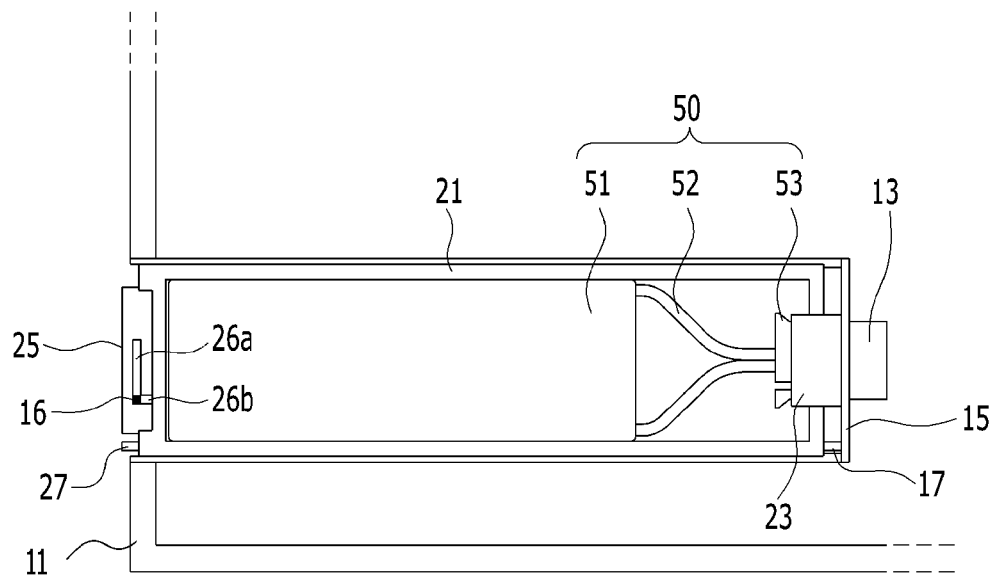
FIG. 8 is a plan view showing the battery mounting guide shown in FIG. 3, which is fitted in the battery mounting unit.

FIG. 8 is a plan view showing the battery mounting guide 20 shown in FIG. 3, which is fitted in the battery mounting unit 12. When the battery mounting guide 20 comes into contact with the inner end of the battery mounting unit 12 and the battery connector 53 is thus coupled to the unit connector 13, the outer surface of the knob 25 is flush with the housing 11, and the interior of the battery mounting unit 12 is shielded by the knob 25, whereby the interior cannot be seen from the outside.

The battery mounting unit 12 may further be provided at one inner end thereof with leaf springs 15, which serve to bias the battery mounting guide 20 so as to enable the battery mounting guide 20 to be easily separated from the battery mounting unit 12 upon separation of the battery mounting guide 20.

As shown in FIG. 6, the leaf springs 15 are configured to have an arcuate shape that is convex toward the inlet of the battery mounting unit 12 such that the leaf springs 15 are flattened by the pressing force of the battery mounting guide 20 when the battery mounting guide 20 is inserted into the battery mounting unit 12, as shown in FIG. 8.

As shown in FIG. 7, the leaf springs 15 may be positioned over and under the battery connector 53 so as not to overlap the unit connector 13.

At this point, in order to lock the battery mounting guide 20 to the battery mounting unit 12 against the biasing force acting on the battery mounting guide 20, the locking unit is provided. The locking unit is positioned at the external end of the battery frame 21 so as to enable the battery mounting guide 20 to be easily locked by a user after the battery mounting guide 20 is inserted.

According to this embodiment, the locking unit includes the locking groove 26 formed in the outer circumferential surface of the knob 25 and the locking protrusion 16 protruding from the inner surface of the battery mounting unit 12. As shown in FIG. 8, after the locking protrusion 16 is inserted into the locking groove 26, the knob 25 is rotated by the user so as to prevent the separation of the locking protrusion 16 from the locking groove 26.

The locking groove 26 includes a first locking groove section 26a extending along the outer circumferential surface of the circular knob 25 and a second locking groove section 26b extending from one end of the first locking groove section 26a to the inner surface of the knob 25 that faces the battery frame 21. As shown in FIG. 8, when the battery mounting guide 20 is completely inserted into the battery mounting unit 12, the locking protrusion 16 protruding from the inner surface of the battery mounting unit 12 enters the second locking groove section 26b. At this time, when the knob 25 is rotated by the user, the locking protrusion 16 is positioned in the first locking groove section 26a, thus locking the battery mounting guide 20 to the battery mounting unit 12.

When the knob 25 is rotated in the opposite direction, the locking protrusion 16 is moved along the first locking groove section 26a and is separated from the locking groove 26 through the second locking groove section 26b. At this time, the battery mounting guide 20 is pushed outward by the elastic force of the leaf springs 15, and is thus separated from the battery mounting unit 12.

The emergency calling system according to the present invention may include a first pin 27 passing through both ends of the battery frame 21 and a second pin 17 protruding from the inner end of the battery mounting unit 12. When the battery mounting guide 20 is inserted into the battery mounting unit 12, the second pin 17 pushes the inner end of the first pin 27, and the first pin 27 is projected from the external end of the battery frame 21, as shown in FIG. 2.

Accordingly, a user can determine whether the battery connecter 53 is correctly coupled to the unit connector 13 by viewing whether the first pin 27 projects from the battery frame 21. In other words, the user can determine whether the battery connecter 53 is correctly coupled to the unit connector 13 without having to check the interior of the emergency calling system.

As described above, the emergency calling system 10 according to an embodiment of the present invention obviates the troublesome work of opening and closing the entire housing 11 and replacing the used battery in the emergency calling system with a fresh one, thus making it easier to replace a battery.

Further, it is possible to determine whether a battery is correctly mounted in the emergency calling system.

In addition, since the battery mounting guide 20 is projected by itself from the battery mounting unit 12 when the locking unit is released, it is possible to easily separate the battery mounting guide 20.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An emergency calling system comprising:
   a housing for accommodating a radio communication module therein;
   a battery mounting guide including a battery frame in which a battery is seated, a connector holder disposed at one end of the battery frame, and a knob disposed at another end of the battery frame;
   a battery mounting unit, which is provided on one side of the housing and in which the battery mounting guide is fitted;
   a unit connector, which is disposed at an inner end of the battery mounting unit and is connected to a connector of the battery; and
   a locking unit for locking the battery mounting guide to the battery mounting unit,
   wherein the locking unit comprises:
      a locking protrusion protruding from the battery mounting unit; and
      a locking groove, which is formed in an outer circumferential surface of the knob and with which the locking protrusion engages so as to lock the battery mounting guide.

2. The emergency calling system according to claim 1, wherein the knob is configured to have a circular plate shape, and is rotatably coupled to the battery frame.

3. The emergency calling system according to claim 1, wherein the locking groove comprises:
   a first locking groove section extending along an outer circumferential surface of the knob; and
   a second locking groove section extending from one end of the first locking groove section to an inner surface of the knob that faces the battery frame.

4. The emergency calling system according to claim 1, wherein the knob includes a groove formed in an outer surface thereof so as to allow the knob to be grasped by a user's finger.

5. The emergency calling system according to claim 1, wherein the connector holder comprises:
   a lower holder part secured to the battery frame; and
   an upper holder part, which is detachably coupled to the lower holder part and is coupled to an upper portion of the battery connector.

6. The emergency calling system according to claim 1, further comprising:
   a first pin passing through both ends of the battery frame; and
   a second pin protruding from an inner end of the battery mounting unit,
   wherein when the battery mounting guide is inserted into the battery mounting unit, the second pin pushes an inner end of the first pin, and the first pin is projected from an external end of the battery frame.

7. The emergency calling system according to claim 1, wherein the battery frame is configured to have a rectangular shape surrounding the battery.

8. The emergency calling system according to claim 1, wherein the battery frame includes a frictional member having a high coefficient of friction and provided on an inner surface thereof.

9. The emergency calling system according to claim 1, wherein the battery frame includes a support for supporting a lower portion of the battery.

10. The emergency calling system according to claim 1, further comprising a leaf spring provided at an inner end of the battery mounting unit,
   wherein the leaf spring pushes out the battery mounting guide from the battery mounting unit when the locking unit is released.

11. The emergency calling system according to claim 10, wherein the leaf spring includes a pair of leaf springs, which are positioned above and under the unit connector, respectively.

12. The emergency calling system according to claim 10, wherein the leaf spring is configured to have an arcuate shape that is convex outward from an inner end of the battery mounting unit.

* * * * *